United States Patent Office 3,457,446
Patented July 22, 1969

3,457,446
REINFORCING UNIT FOR COMMUTATORS OF ELECTRICAL MACHINES
Karlen Arminakovich Akunts, ulitsa Zemgalju, 23a, kv. 27; Alexandr Efimovich Kartsev, ulitsa Aptekarskaya, 8, kv. 72; Ivan Nikiforovich Elchaninov, ulitsa Aptekarskaya, 8, kv. 67; Jury Matveevich Tarnopolsky, ulitsa Gorkogo 79/81, kv. 41; and Aron Yakovlevich Fish, ulitsa Gorkogo 106/108, kv. 14, all of Riga, U.S.S.R.
Filed Jan. 20, 1966, Ser. No. 521,905
Int. Cl. H02k 3/30
U.S. Cl. 310—235   7 Claims

ABSTRACT OF THE DISCLOSURE

A reinforcing unit for commutators of electrical machines comprises a plurality of juxtaposed turns of a high strength material (plastic glass band, metal wire, or metal bands) wound on a base having clamps at the lateral edges thereof, which are clamped over the turns to fixedly hold the same on the base and form a self-supporting unit which is embedded and enclosed in an annular body of plastic material with a long fibered filler.

---

The present invention relates to reinforcing units for commutators of electrical machines, and more particularly to plastic sealed reinforcing units.

As is known, commutators of electrical machines encased in plastic find increasing application in the above machines. This is due to their technical and economical advantages over commutators encased in metal. When developing heavier duty types of commutators, the strength of the carrying plastic body has proven insufficient, and there has arisen the necessity of reinforcing the carrying plastic body with special rings.

Until now, reinforcement of the plastic body has been effected by metal rings offering low mechanical strength. Such a design substantially limits the diameter and permissible circumferential speed of plastic-sealed commutators and requires specific measures to preclude closing of the commutator bars onto the reinforcing rings.

Known at present is a reinforcing unit for commutators of electrical machines, said unit representing a multi-turn bandage coil of a high strength plastic-sealed material housed in the plastic body of the commutator.

The use of such a reinforcing unit makes it possible to obtain large size high speed plastic-sealed commutators for electrical machines, including traction motors. However, the design of said reinforcing unit does not exclude soldering or welding when connecting the turns of the coil. As is well known, when using lead-tin solders in plastic sealing, the solder gets soft, spreads over the plastic and subsequently causes closing of the commutator bars, whereas welding results in sharp deterioration of the reinforcing unit strength.

An object of the present invention is to provide a preset configuration of the coil by using a base to fasten the coil turns.

A further object of the invention is to avoid soldering when connecting the coil turns.

Another object of the invention is to avoid welding in the connecting of the coil turns.

Still another object of the invention is to increase both the electrical and mechanical strength of a reinforcing unit.

These and other objects of the invention are achieved by laying the coil turns made of a high strength material, onto a base and fastening said turns by clamping means on the base.

The coil turns are made of a high strength wire, i.e. metal, or plastic glass bands wound on the broad side, while the base is made of a metal sheet or band. Besides, a plastic material with, e.g. long-fibered filler, is used to seal the reinforcing unit.

Other objects and advantages of the invention will be more apparent upon a consideration of the following description thereof, reference being had to the accompanying drawing, wherein.

Figure 1:
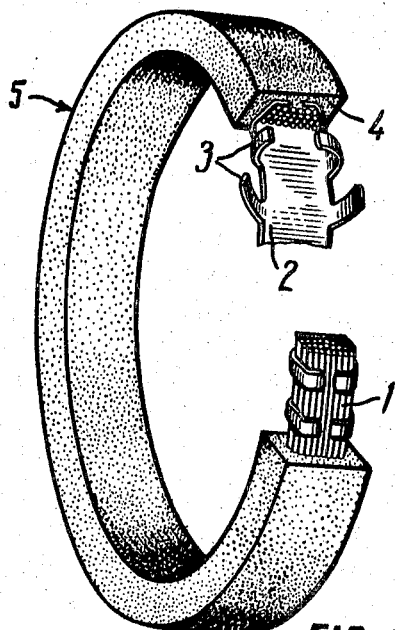
FIG. 1 is a perspective view, partly cut away, of reinforcing unit for commutators of electrical machines, with coil turns made of wire.

Coil turns 1 (FIG. 1) made of a high-strength wire are wound tightly on base 2 made of a metal sheet or band or the like. The number of turns 1 and the diameter of wire are determined when calculating the strength of the commutator. To fasten the wound coil wire turns 1 to base 2, the latter is fitted with clamps 3 distributed along the length of base 2 at the lateral edges thereof.

Figure 2:
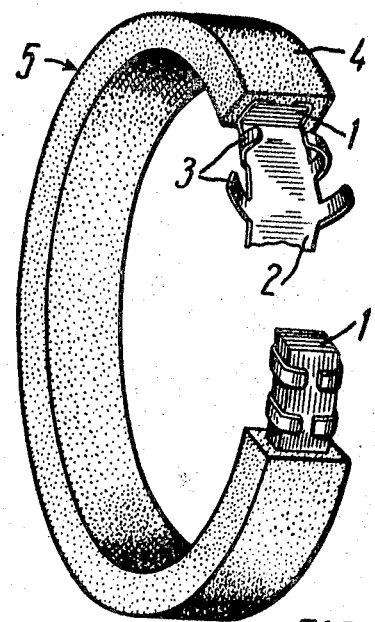
FIG. 2 is a similar view of a reinforcing unit with coil turns made of bands.
Figure 3:
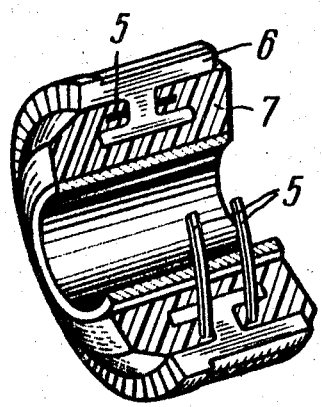
FIG. 3 is a partial section of a plastic-sealed commutator with a reinforcing unit, according to the invention.

Base 2 provides for the winding and sealing of the metal coil. In such a position, base 2, with coil turns wound on it, acquires the necessary rigidity for being subsequently sealed with plastic. To simplify the manufacturing process, coil turns 1 can be made of metal or plastic glass bands (FIG. 2). Used for sealing is a long-fibered plastic material 4 which possesses high heat resistance, and high electrical and mechanical strength. Sealing with a plastic material makes for the required rigidity of reinforcing unit 5 (FIG. 3) and improves its insulating properties, which guarantees against contact of commutator bars 6 with the metal of reinforcing unit 5. The cross sectional shape of reinforcing unit 5 is selected so that during the sealing, said unit properly fits into the cuts of bars 6 and is safely fixed in a preset place in plastic body 7 of the commutator.

Figure 4:
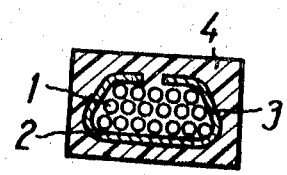
FIGS. 4, 5 and 6 illustrate, in cross section, several modifications of reinforcing units.
Figure 5:
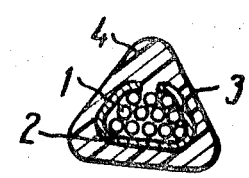
Figure 6:
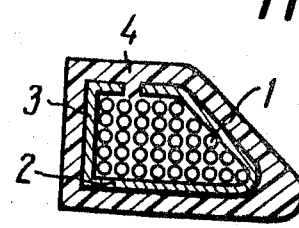

As shown in FIGS. 4, 5 and 6, the cross section of reinforcing unit 5 can be of varied shape, e.g., rectangular (FIG. 4), triangular (FIG. 5), rectangular trapezoid (FIG. 6), or other suitable form depending upon the commutator's bar design. Such a design of a reinforcing unit make it possible to obtain a desired configuration of the coil, avoid soldering or welding and increase the electrical and mechanical strength of the reinforcing unit.

We claim:

1. A reinforcing unit for commutators of electrical machines, said unit comprising a plurality of juxtaposed turns of a high strength material, a base on which said turns are wound, said base having lateral edges and including clamping means thereon to clamp said turns to the base, and an annular body of plastic material in which said base and turns are embedded and enclosed.

2. A reinforcing unit as claimed in claim 1 wherein said turns are constituted by a metal band.

3. A reinforcing unit as claimed in claim 1 wherein said turns are constituted by a plastic glass band.

4. A reinforcing unit as claimed in claim 1 wherein said base is a metal.

5. A reinforcing unit as claimed in claim 1 wherein said body of plastic material includes a long fiber reinforcement filler.

6. A reinforcing unit as claimed in claim 1 wherein said clamping means comprises a plurality of spaced lateral projections on said edges distributed along the length of the base.

7. In a commutator of an electrical machine, a commutator bar of annular shape, a plastic body in which said commutator bar is embedded, and a reinforcing unit for securing the bar in said plastic body, said reinforcing unit being of annular shape and comprising a plurality of juxtaposed turns of a high strength material, a base on which said turns are wound, said base having lateral edges and including clamping means extending laterally from said edges for being clamped over the turns on the base to fixedly hold the turns on the base, and an annular body of plastic material in which said base and turns are embedded and enclosed.

References Cited

UNITED STATES PATENTS

| | | | |
|---|---|---|---|
| 2,533,775 | 12/1950 | Durrschmidt | 310—235 |
| 2,674,784 | 4/1954 | Roberts et al. | 310—235 |
| 3,079,520 | 2/1963 | Schafer | 310—235 |
| 3,290,527 | 12/1966 | Habermann | 310—233 |
| 1,075,502 | 10/1913 | Scott | 310—236 |

FOREIGN PATENTS 100,832   7/1916   Great Britain.

OTHER REFERENCES

German printed application 1, 130, 917, June 7, 1962.

WARREN E. RAY, Primary Examiner